Figure 1:
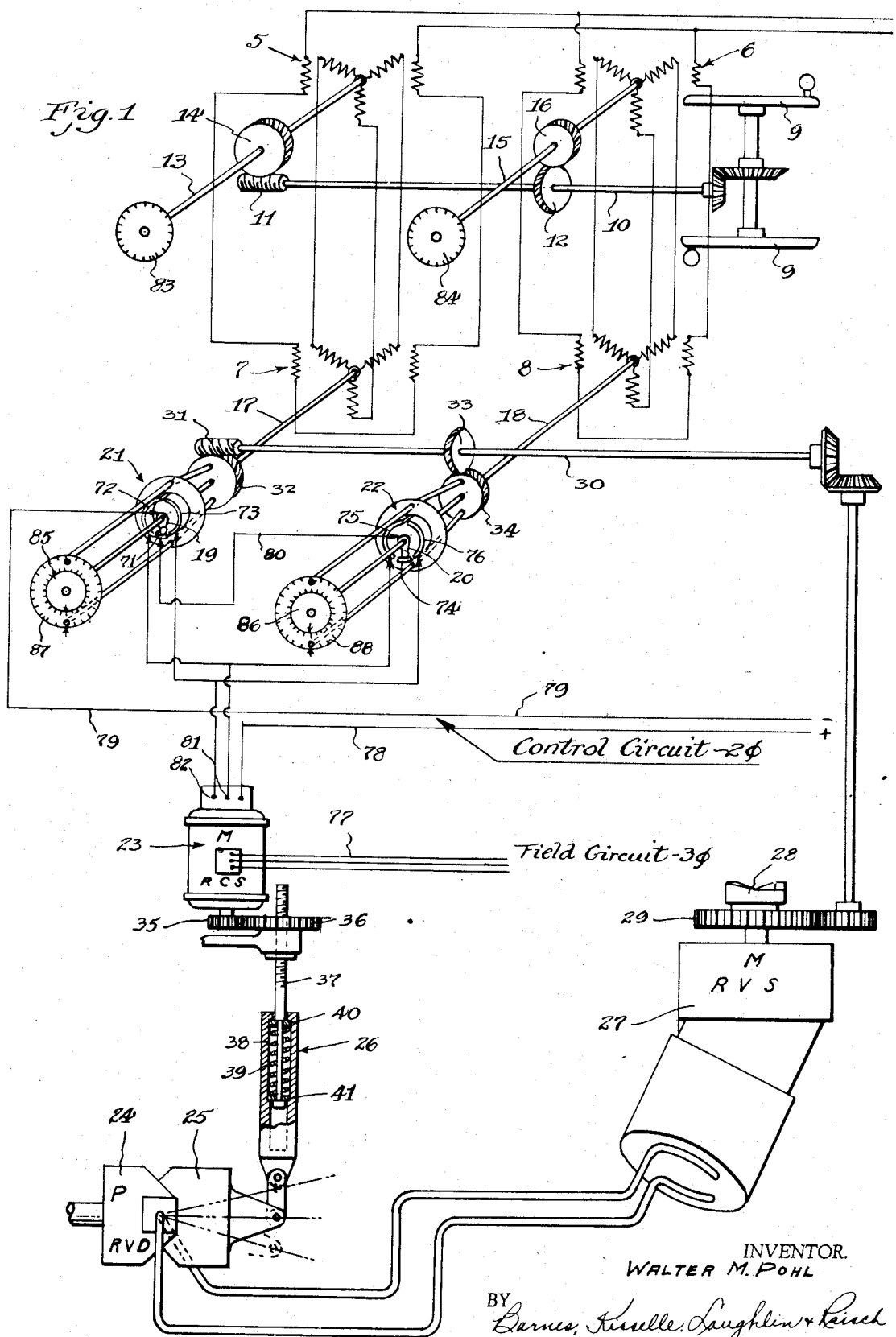

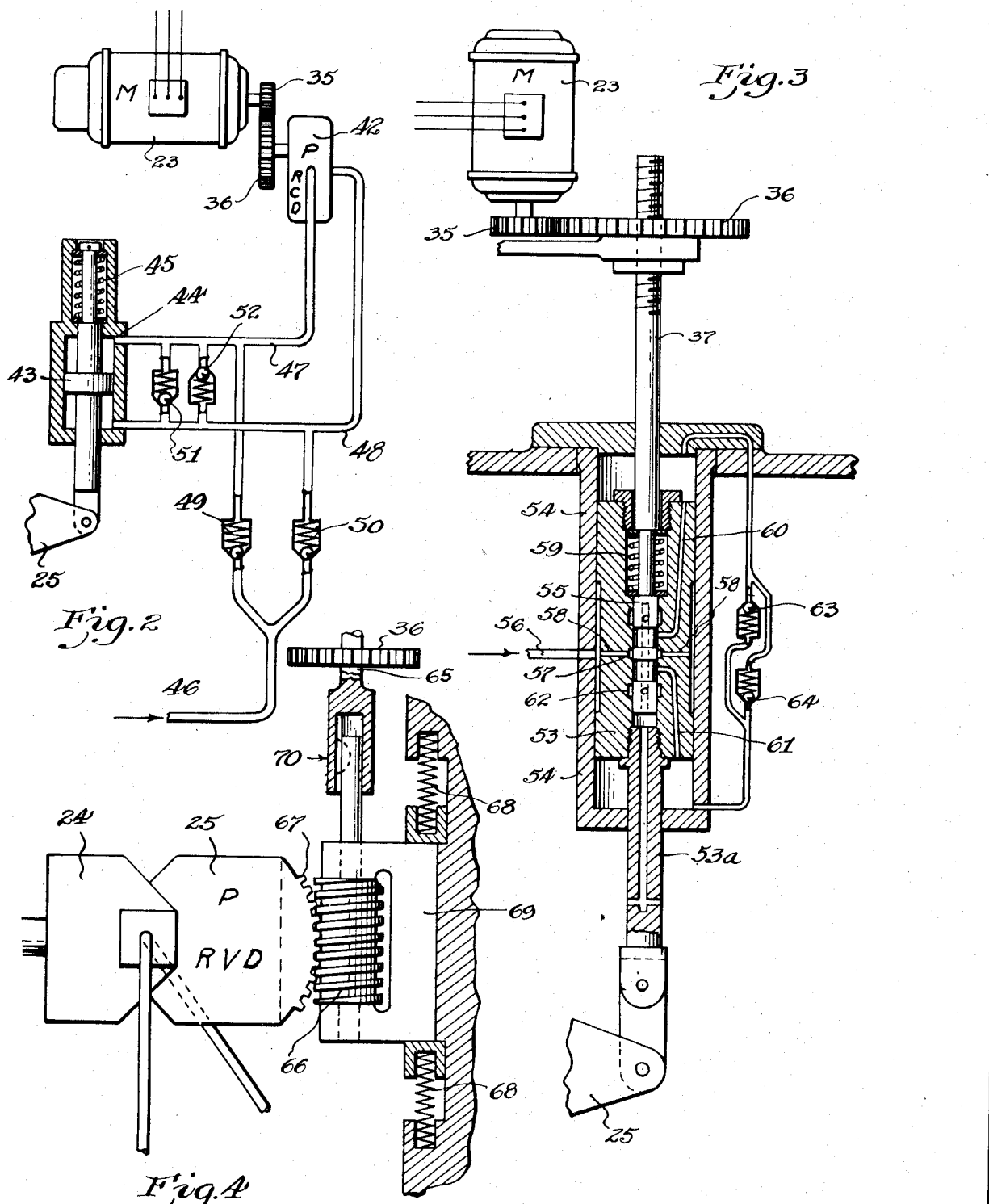

Patented Sept. 18, 1945

2,384,962

UNITED STATES PATENT OFFICE 2,384,962

SYNCHRONIZING POWER CONTROL UNIT

Walter M. Pohl, Washington, D. C., assignor to Vickers, Incorporated, Detroit, Mich., a corporation of Michigan Application February 7, 1939, Serial No. 255,172

6 Claims. (Cl. 60—53)

This invention relates to an improved synchronizing power control unit.

It is an object of the invention to provide a control unit for power machinery and to maintain a substantial synchronism between the power output shaft of such machinery and the measured movement of a control device. In many cases, and particularly in the case of machinery used in manipulating heavy masses, it is desirable to use a system of remote control in which the movement of a mass will be proportionate to that of a remotely located control member, in direction, magnitude and velocity. Various control devices serving this purpose have been designed in the past but these have involved the use of a large number of delicate parts and their adjustment is often extremely critical.

An object of the present invention is to provide a simple and rugged transmitting means with which substantial synchronism may be obtained between the manually controlled input shaft and the power output shaft. In many devices designed to function as a servo-control mechanism, deviations will occur between the power and the output shaft; in the case of a hydraulic follow-up valve, for example, a lag occurs due to the opening of the valve and a lead occurs during deceleration due to the closure of the valve; therefore, a further object of the present invention is to reduce such deviations to a minimum and to make corrections for them as they occur.

One embodiment of the present invention utilizes the principle of synchronous motors in a transmitter and receiver system, but the receiver, instead of operating directly on a power unit, is arranged to operate a system of electric commutation which controls a separate electric motor. This motor, which is designated as the amplifier motor, is used to amplify signals from the control device and convert them into the necessary torque for maintaining the necessary control over the directional movement and speed of the power output shaft in a manner which will be further described. The transmitting means between the control shaft and the output shaft consists, in the main, of a double control to cause immediate reaction between the signal and the response and to provide a continuing signal after the initial signal is transmitted.

The present invention also contemplates an indicating means for showing the degree of relative motion between the control mechanism and the output shaft and for registering the actual motion.

Other objects and features of the invention having to do with details of construction and operation, including the connections between the amplifier motor and the power output unit, will be further set forth in the following description and claims.

In the drawings:

Fig. 1 is a schematic diagram showing an arrangement of the device in connection with a system for the hydraulic transmission of power.

Figs. 2, 3 and 4 have to do with details of the connection between the amplifier motor of the system and the power output mechanism.

The invention is illustrated and described in connection with a follow-up or servo-control mechanism which may be remotely controlled. The remote control, however, is not a necessary feature of the invention since this might be dispensed with without departing from the main idea. The mechanism might be said to consist of two main parts; first, the transmission or signal system, and, second, the amplifying or power mechanism. The transmission or signal system consists essentially of two synchronous motors, used as generators, shown diagrammatically at 5 and 6 and two synchronous motors 7 and 8, also shown diagrammatically, which control directly the signals to be transmitted to the amplifying mechanism. Hand wheels 9 rotate a shaft 10 on which are mounted gears 11 and 12. On a shaft 13 of the motor generator 5 is a gear 14 which meshes with the gear 11 to provide a gear ratio of about 1 to 36. On a shaft 15 of the motor generator 6 is mounted a gear 16 which meshes with the gear 12 on the shaft 10 to provide a gear ratio of 1 to 1. These gear ratios are exemplary only and may be varied in each case.

The motors 7 and 8 have shafts 17 and 18, respectively, on which shafts are mounted roller arms 19 and 20. Concentric with the shaft 17 is a commutator generally indicated at 21, which is contacted by the roller arm 19. Concentric with the shaft 18 is a commutator 22 which is contacted by the roller arm 20. The commutators 21 and 22 are rotatably mounted independent of the shafts 17 and 18. The details of these commutators and mechanism for moving the same will be described later.

The amplifying or power system consists of a reversible amplifier electric motor 23, a variable delivery pump 24 having a movable member 25 for varying the displacement of said pump, a connecting mechanism which is indicated generally at 26 between the motor 23 and the movable part 25, and a hydraulic motor 27 having a power output shaft 28. A gear 29 mounted on the shaft 28 drives, through suitable gears and shafts, a shaft 30 upon which is mounted a gear 31 which meshes, with a ratio of 1 to 36, with a gear 32 connected to the commutator 21. Also on the shaft 30 is a gear 33 which meshes, with a ratio of 1 to 1, with a gear 34, the latter gear being connected to the commutator 22. This mechanism which connects the power output shaft 28 to the commutators 21 and 22 is called a response mechanism.

Taking up more in detail the connecting mechanism 26, the motor 23 drives a gear 35 which meshes with a gear 36. Threaded through the gear 36 is a shaft 37 which is to be shifted vertically, as viewed in Fig. 1, by rotary movement of the gear. The lower end of the shaft 37 projects into a housing 38 which encloses a spring 39 surrounding the shaft. Collars 40 and 41 on the shaft 37 contact the opposite ends of the spring 39 and these collars are slidable on the shaft which is provided with suitable stops so that a resilient connection is at all times maintained between the shaft 37 and the housing 38. It will thus be seen that movement of the motor 23 will immediately cause a movement of the member 25 on the variable displacement pump 24 so that the volume liquid under pressure which is supplied to the hydraulic motor 27, is controlled.

Figs. 2, 3 and 4 illustrate other mechanisms and devices for connecting the amplifier motor 23 with the movable member 25 of the pump 24. Referring to Fig. 2, the gear 36 drives a pump 42 which directs liquid under pressure to one end or the other of a piston cylinder motor 43—44. The piston 43 is provided with a centering spring 45. A hydrostatic pressure is maintained in the hydraulic circuit shown, through a pipe 46 which branches to connect with a pipe 47 and a pipe 48 through relief valves 49 and 50, respectively. When pump 42 is driven by the amplifier motor 23, a pressure differential is established in the two ends of the cylinder 44, the effect of which is to cause piston 43 to move the tilting block off center. The direction of this movement will depend on the direction of rotation of the amplifier motor. Pressure relief valves 51 and 52 are provided in the circuit to permit movement of the tilting block 25 by a force extraneous to the servo-mechanism, in case such should be necessary.

In Fig. 3 the tilting block 25 is connected to a hydraulically operated piston 53 located in the cylinder 54. The movement of the piston 53 is controlled by a sliding valve 55 which is to be operated by the shaft 37. Hydraulic pressure for moving the piston 53 is supplied through a pipe 56 and reaches a central port 57 through passageways 58. This port 57 is normally closed by valve 55 which is self-centering due to a spring 59. If the amplifier motor is caused to rotate in either direction, the valve 55 will move slidably up or down with relation to piston 53 and this movement will admit pressure to one end of the piston 53 and connect the other end of the piston with the tank. For example, if valve 55 is moved downward with respect to the piston, pressure will then be admitted to the upper end of the cylinder through passage 60 while fluid in the lower end of the cylinder is expelled through a passage 61, a port 62 and central passageways in the valve 55 and in a piston rod 53a which connects the piston with the movable member 25. It will thus be seen that a hydraulic follow-up valve is provided. Pressure relief valves 63 and 64 are provided to permit the operation of the tilting block 25 by force which is extraneous to the servo-mechanism.

In Fig. 4 the gear 36, driven by the amplifier motor, is rigidly fastened to a shaft 65 which drives a worm 66. The tilting block 25 is fitted with a worm gear sector 67 so that rotation of the gear 36 will cause displacement of the tilting block 25. Springs 68 normally tend to center a bearing block 69 which contains the worm 66 and since the connection between the shaft 65 and the worm 66 is a feather connection 70, the tilting block control may be taken over by a force independent of the servo-mechanism, if such is necessary.

In the operation: Referring to Fig. 1, if the hand wheels 9 are turned in a direction which will cause a clockwise motion of the synchronous motors, both roller arms 19 and 20 will rotate relative to the commutator rings 21 and 22. The commutator ring 21 consists of a small central segment 71 and two arcuate segments 72 and 73. The commutator ring 22 consists of a small neutral segment 74, and two arcuate segments 75 and 76. The field circuit of the motor 23 is constantly energized by a circuit indicated generally at 77. The two phase armature circuit comprises a line 78 which connects directly to the motor and a line 79 which passes to the roller arm 19. The small segment 71 of the commutator 21 is connected to roller arm 20 by a line 80. The motor 23 is, of course, reversible and is provided with two poles 81 and 82, each of which controls a different direction of the motor. The pole 81 of motor 23 is connected electrically with segments 72 and 75 of commutators 21 and 22, respectively. Similarly, the pole 82 of the motor 23 is connected electrically with segments 73 and 76. It will be seen that as the parts stand in Fig. 1, current may be directed from line 79 through roller arm 19, segment 71 and line 80 to roller arm 20. Movement of the hand wheels, as above described, will result in movement of the roller arms in a clockwise direction. However, because of the ratio of the gear connections between the hand wheels and the motors 5 and 6, the roller arm 20 will move at a much faster rate than roller arm 19. Consequently, while roller arm 19 is still on the segment 71, the roller arm 20 will be contacted by segment 75 of commutator 22. This will direct electric current to the pole 81 of motor 23 and initiate movement of the amplifying system. Motion of the amplifier motor will cause displacement of the pump tilting block 25 and the consequent motion of the output shaft 28 in such a direction that the shaft 30 will rotate commutators 21 and 22 in a direction corresponding to that of the roller arms. Because of the inherent lag in the response, the commutators will not immediately assume the speed of the control or signal which is transmitted to the roller arms and the roller arm 20 will continue to advance around the segment 75. The gear ratio of gears 12 and 16 and 11 and 14 are so arranged that before the roller arm 20 reaches the segment 76, the roller arm 19 will have advanced to a point where it contacts segment 72 of commutator 21. Movement of the roller arm 19 off from the segment 71 will, of course, disconnect the current from roller arm 20. Arm 20 may then continue to rotate without reversing the phase. The motor 23, however, will continue to be operated through the line 79 and segment 72.

During this time the velocity of the response motion from the output shaft 28 is steadily increasing and when it exceeds the velocity of the signal motors 7 and 8, the commutators 72—73 will overtake their respective roller arms so that there will be a reverse in phase. In other words, upon this overtaking, the current will be passed from the line 79 through segment 76 and subsequently 73 to the pole 82 of motor 23 thereby causing a reversal of the motor. This reversal of the motor will cause a retraction of the tilting block 25 towards its neutral position and thus slow down the motor 28 until once again the movement of the roller arms becomes faster than the response motion. In this way there will be a cycle of movement in which absolute synchronism between the output shaft 28 and the input hand wheels 9 will occur twice in each cycle. By repeating the process an infinite number of times an approximate synchronism between signal and response is reached.

Referring to Fig. 1, it will be seen that on the shafts 13 and 15 are dials 83 and 84 respectively, which are used to indicate angular displacement of the signal motors 5 and 6. Connected to the shafts 17 and 18 which drive the roller arms 19 and 20 are dials 85 and 86. Concentric with dials 85 and 86 are dials 87 and 88, the movement of which is simultaneously with that of commutators 21 and 22 respectively. The relationship between the dials 85 and 87 or 86 and 88 will indicate the amount of lag between the signal and the response. Twice during each cycle of the movement there will be absolute synchronism at which time the pointer on the inner dials 85 and 86 will register zero on the outer dials 87 and 88.

What I claim is:

1. In a follow-up device of the type having an input shaft, a variable speed reversible power source, and an output shaft operated by said power source, a regulator means for controlling the speed and direction of said power source comprising a reversible electric motor for actuating said regulator means, a first commutator switch comprising opposed arcuate contact members, a contact arm responsive to movement of said input shaft and adapted to contact said arcuate members to cause energization of said motor, a similar second switch having opposed arcuate contact members, an intervening neutral member, and a contact arm responsive to movement of said input shaft, electrical connections between said commutators and said motor, and electrical connections between a source of electrical energy and said contact arms, the connection to said first contact arm existing when said second contact arm contacts said neutral member, means connecting said input shaft and said contact arms whereby movement of said shaft will connect said arms with said contact members, said last named means being arranged such that said first contact arm is moved at a faster rate than said second arm, to reduce lag between movement of said input shaft and said output shaft, and a response mechanism connecting said output shaft with said commutators to cause follow-up movement of said contact members whereby approximate synchronism may be achieved between said input and output shafts.

2. In a follow-up transmitter of the type having an input shaft, an output shaft, a power amplifier unit comprising a hydraulic motor, a pressure source connected to said motor, and movable means for controlling the speed of said motor by regulating the volume of pressure liquid to be utilized by said motor, a control device for said transmitter comprising a second motor for controlling by its movement, the position of said movable means, means connecting said second motor to said movable means comprising a rod threaded at one end, resilient means connecting said rod to said movable means to permit movement in either direction between said rod and movable means, and a means rotatable by said second motor for acting on the screw end of said rod to move the same, a connecting means responsive to movement of said input shaft for initiating movement of said second motor, a second connecting means responsive to movement of said input shaft for continuing the movement of said second motor and for rendering inoperable said first connecting means, said first connecting means being responsive to movement of said input shaft to a greater degree than said second connecting means to cause immediate movement of said second motor upon movement of said input shaft, and response means operably connecting said output shaft and said connecting means whereby said second motor is reversed when the output shaft overruns the input shaft in order that approximate synchronism may be maintained between said output shaft and said input shaft.

3. In a follow-up transmitter of the type having an input shaft, an output shaft, a power amplifier unit comprising a hydraulic motor, a pressure source connected to said motor, and movable means for controlling the speed of said motor by regulating the volume of pressure liquid to be utilized by said motor, a control device for said transmitter comprising a second motor for controlling, by its movement, the position of said movable means, means connecting said second motor to said movable means comprising a rod to be rotated by said second motor and screw means on said rod operably connected with said movable means whereby rotation of said rod will shift said movable means, a sliding connection between said rod and said motor, a connecting means responsive to movement of said input shaft for initiating movement of said second motor, a second connecting means responsive to movement of said input shaft for continuing the movement of said second motor and for rendering inoperable said first connecting means, and response means operably connecting said output shaft and said connecting means whereby said second motor is reversed when the output shaft overruns the input shaft in order that approximate synchronism may be maintained between said output shaft and said input shaft.

4. In a follow-up transmitter of the type having an input shaft, an output shaft, a power amplifier unit comprising a hydraulic motor, a pressure source connected to said motor, and movable means for controlling the speed of said motor by regulating the volume of pressure liquid to be utilized by said motor, a control device for said transmitter comprising a second motor for controlling, by its movement, the position of said movable means, means connecting said second motor to said movable means comprising a piston operably connected to said movable means, a reversible pump to be operated by said second motor and hydraulic lines connecting said piston with said reversible pump whereby movement of said second motor results in displacement of said movable means, check valves in said lines to permit independent movement of said movable means by an outside force, a connecting means responsive to movement of said input shaft for initiating movement of said second motor, a second connecting means responsive to movement of said input shaft for continuing the movement of said second motor and for rendering inoperable said first connecting means, and response means operably connecting said output shaft and said connecting means whereby said second motor is reversed when the output shaft overruns the input shaft in order that approximate synchronism may be maintained between said output shaft and said input shaft.

5. In a follow-up device of the type having an input shaft, a variable speed reversible power source, and an output shaft operated by said power source, a regulator means for controlling the speed and direction of said power source and a reversible electric motor for actuating said regulator means, a control means operably connecting said input shaft and said regulator means comprising a first switch means, a second switch means, both switch means being connected to said electric motor, means interconnecting said switches and a source of electric current whereby said first switch receives current through said second switch when said second switch is in neutral position, means for operating said switches to energize said motor, said means being responsive to movement of said input shaft and being so arranged that operation of said first switch means will take place faster than operation of said second switch means to cause immediate energization of said electric motor upon movement of said input shaft, the movement of said first switch means being followed directly by a movement of said second switch means to continue energization of said motor and discontinue the effect of said first switch means, and a response mechanism operably connecting said switches and said output shaft to compensate for movement of said switches by said input shaft to effect thereby an approximate synchronism between said shafts.

6. In a follow-up transmitter of the type having an input shaft, an output shaft, a power amplifier unit comprising a hydraulic motor, a pressure source connected to said motor, and movable means for controlling the speed of said motor by regulating the volume of pressure liquid to be utilized by said motor, a control device for said transmitter comprising a second motor for controlling by its movement, the position of said movable means, means connecting said second motor to said movable means whereby operation of said motor causes movement of said movable control means, a first connecting means responsive to movement of said input shaft for initiating movement of said second motor, a second connecting means responsive to movement of said input shaft for continuing the movement of said second motor and for rendering inoperable said first connecting means, said first connecting means being responsive to movement of said first input shaft to a greater degree than said second connecting means to cause immediate movement of said second motor upon movement of said input shaft, and response means operably connecting said output shaft and said connecting means whereby said second motor is reversed when the output shaft overruns the input shaft in order that approximate synchronism may be maintained between said output shaft and said input shaft.

WALTER M. POHL.